United States Patent
Im et al.

(10) Patent No.: US 12,116,822 B2
(45) Date of Patent: Oct. 15, 2024

(54) POWER TRUNK DEVICE

(71) Applicants: Hyundai Motor Company, Seoul (KR); Kia Corporation, Seoul (KR); Pyeong Hwa Automotive Co., Ltd., Daegu (KR)

(72) Inventors: Yong Hyuck Im, Seoul (KR); Seong Tae Hong, Daegu (KR)

(73) Assignees: Hyundai Motor Company, Seoul (KR); Kia Corporation, Seoul (KR); Pyeong Hwa Automotive Co., Ltd., Daegu (KR)

( * ) Notice: Subject to any disclaimer, the term of this patent is extended or adjusted under 35 U.S.C. 154(b) by 536 days.

(21) Appl. No.: 17/375,224

(22) Filed: Jul. 14, 2021

(65) Prior Publication Data
US 2022/0098908 A1   Mar. 31, 2022

(30) Foreign Application Priority Data
Sep. 29, 2020   (KR) .................. 10-2020-0126925

(51) Int. Cl.
*E05F 15/63*  (2015.01)
*B62D 25/12*  (2006.01)
*E05D 3/14*  (2006.01)

(52) U.S. Cl.
CPC .............. *E05F 15/63* (2015.01); *B62D 25/12* (2013.01); *E05D 3/145* (2013.01); *E05Y 2600/46* (2013.01); *E05Y 2900/548* (2013.01)

(58) Field of Classification Search
CPC ...... B62D 25/10; B62D 25/105; B62D 25/12; E05D 3/145; E05F 15/611; E05F 15/63

USPC .......................................................... 296/76
See application file for complete search history.

(56) References Cited

U.S. PATENT DOCUMENTS

| 7,314,243 | B2 * | 1/2008 | Okada ................... E05F 15/611 296/76 |
| 8,251,431 | B2 * | 8/2012 | Nakazato .............. E05F 1/1033 296/76 |
| 10,844,648 | B2 * | 11/2020 | Im .......................... E05F 15/63 |
| 2010/0251519 | A1 * | 10/2010 | Duffy ..................... E05D 5/062 16/382 |
| 2016/0194911 | A1 | 7/2016 | Im |
| 2021/0246702 | A1 * | 8/2021 | Song ..................... B62D 25/12 |

FOREIGN PATENT DOCUMENTS

KR         101637805 B1    7/2016

* cited by examiner

*Primary Examiner* — Jason S Daniels
(74) *Attorney, Agent, or Firm* — Slater Matsil, LLP

(57) ABSTRACT

A power trunk device includes a hinge arm coupled to a trunk lid and configured to be rotatably coupled to a vehicle body panel to define a trunk space, the hinge arm being configured to open and close the trunk lid, a torsion bar link rotatably coupled to a middle of the hinge arm, a torsion bar connected between the torsion bar link and the vehicle body panel in front of the hinge arm, the torsion bar being configured to provide elastic force in a direction in which the trunk lid is opened, and an electric drive unit connected between the hinge arm and the torsion bar, the electric drive unit being configured to be moved together with the hinge arm while providing rotational force to the hinge arm.

20 Claims, 12 Drawing Sheets

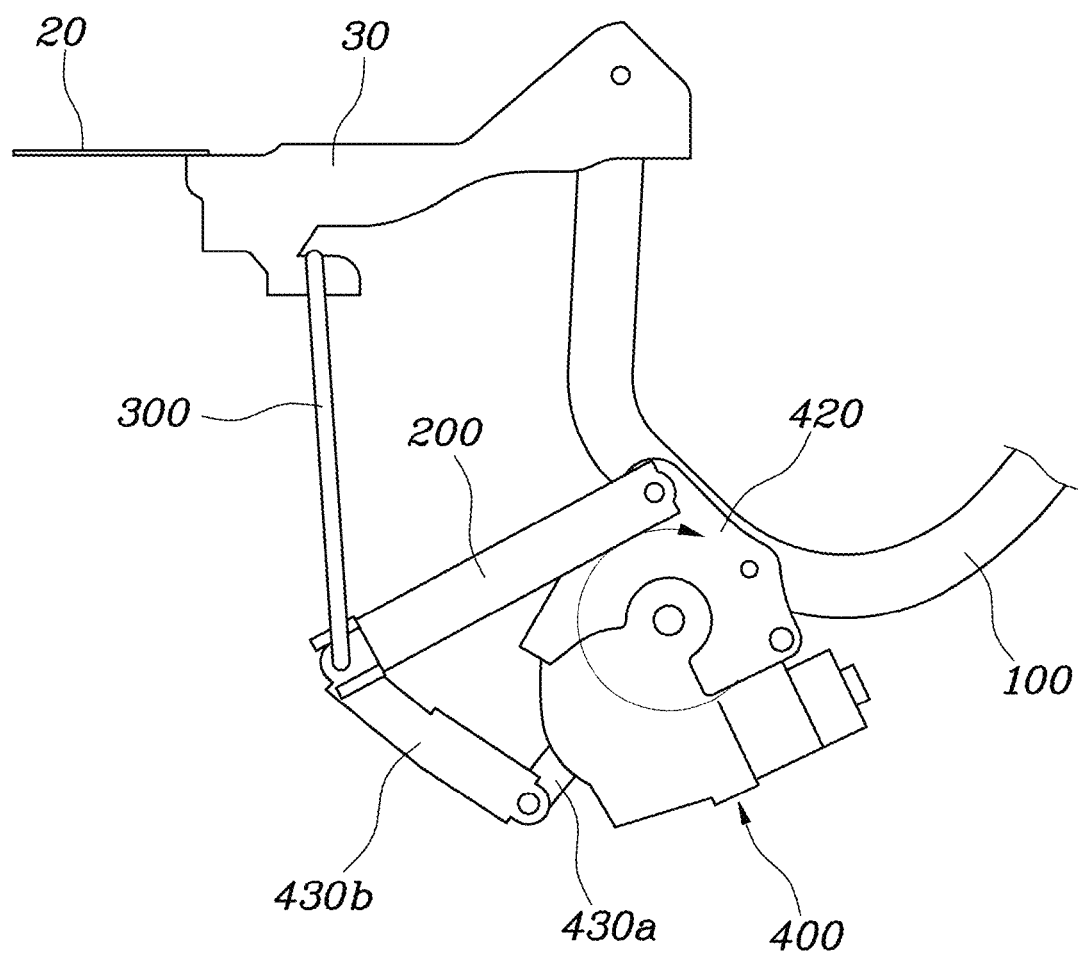

POWER TRUNK DEVICE

CROSS-REFERENCE TO RELATED APPLICATIONS

This application claims the benefit of Korean Patent Application No. 10-2020-0126925, filed in the Korean Intellectual Property Office on Sep. 29, 2020, which application is hereby incorporated herein by reference.

TECHNICAL FIELD

The present invention relates to a power trunk device.

BACKGROUND

A latch is installed at a trunk lid, and a striker is installed at a vehicle body. When the trunk lid is closed, therefore, the latch is engaged with the striker, whereby the latch is locked. When a release lever is operated, the latch is disengaged from the striker, whereby the latch is unlocked.

Meanwhile, in the case of a power trunk device configured to electrically open the trunk lid, the trunk lid is opened using a spring or a gas lifter.

However, it is difficult to apply the spring-based power trunk device to a torsion-bar-based trunk opening and closing device.

The trunk opening and closing device using the torsion bar is mainly applied to a midsize passenger vehicle, wherein the torsion bar is connected to the vehicle body and a hinge arm such that the trunk lid is opened by elastic force of the torsion bar.

Therefore, there is a need for a power trunk device optimized for a midsize vehicle package through a torsion-bar-based trunk opening and closing mechanism.

The matters disclosed in this section are merely for enhancement of understanding of the general background of the invention and should not be taken as an acknowledgment or any form of suggestion that the matters form the related art already known to a person skilled in the art.

SUMMARY

The present invention relates to a power trunk device. Particular embodiments relate to a power trunk device having an electric opening and closing structure applied to a torsion-bar-based trunk to automatically open and close a trunk lid.

The present invention has been made in view of problems in the art, and an embodiment of the present invention provides a power trunk device having an electric opening and closing structure applied to a torsion-bar-based trunk to automatically open and close a trunk lid.

In accordance with embodiments of the present invention, the above and other objects can be accomplished by the provision of a power trunk device including a hinge arm coupled to a trunk lid while being rotatably coupled to a vehicle body panel defining a trunk space, the hinge arm being configured to open and close the trunk lid, a torsion bar link rotatably coupled to the middle of the hinge arm, a torsion bar connected to the torsion bar link and the vehicle body panel therebetween in front of the hinge arm, the torsion bar being configured to provide elastic force in a direction in which the trunk lid is opened, and an electric drive unit connected to the hinge arm and the torsion bar therebetween, the electric drive unit being configured to be moved together with the hinge arm while providing rotational force to the hinge arm.

The hinge arm may be curved in a "U" shape such that the electric drive unit is coupled to the middle of the hinge arm, and the middle of the hinge arm may be rotated so as to face the front of a vehicle when the trunk lid is closed, whereby the electric drive unit may be located in the trunk space in front of the hinge arm.

The electric drive unit may be installed so as to be rotatable relative to the hinge arm when the hinge arm is rotated.

The electric drive unit may include a motor assembly including a motor configured to provide rotational force to the hinge arm and a rotary shaft provided at one end of a motor housing, the rotary shaft being configured to be rotated in the state of being interlocked with the motor, a motor bracket having one end coupled to the middle of the hinge arm and the other end coupled to the rotary shaft, and a motor link having one end rotatably coupled to the other end of the motor housing and the other end rotatably caught by the lower end of the torsion bar.

Motor brackets may be coupled to opposite sides of the hinge arm, the motor assembly may be assembled between the motor brackets, and one end of each of the torsion bar links may be coupled to a corresponding one of the opposite sides of the hinge arm such that the torsion bar links cover opposite side surfaces of the motor brackets, whereby the electric drive unit may be provided between the torsion bar links.

A first catching portion having a shape open at one side thereof may be formed in the other end of the torsion bar link such that the lower end of the torsion bar is caught by the first catching portion, and a second catching portion having a shape open at one side thereof may be formed in the other end of the motor link such that the second catching portion is caught by the lower end of the torsion bar, the first catching portion and the second catching portion being open in different directions.

When the hinge arm is rotated, the motor assembly may be rotated in a direction opposite a rotational direction of the hinge arm.

The electric drive unit is installed so as to be rotatable in the state of being constrained with respect to the hinge arm when the hinge arm is rotated.

The electric drive unit may include a motor assembly including a motor coupled to the middle of the hinge arm, the motor being configured to provide rotational force to the hinge arm, and a rotary shaft provided at the middle of a motor housing, the rotary shaft being configured to be rotated in a state of being interlocked with the motor, a first motor link having one end coupled to the rotary shaft, and a second motor link having one end hinged to the other end of the first motor link and the other end rotatably caught by the lower end of the torsion bar.

Motor brackets may be coupled to opposite sides of the hinge arm, the motor assembly may be assembled between the motor brackets, and one end of each of the torsion bar links may be coupled to a corresponding one of the opposite sides of the hinge arm such that the torsion bar links cover opposite side surfaces of the motor brackets, whereby the electric drive unit may be provided between the torsion bar links.

A first catching portion having a shape open at one side thereof may be formed in the other end of the torsion bar link such that the lower end of the torsion bar is caught by the first catching portion, and a second catching portion having a shape open at one side thereof may be formed in the other end of the second motor link such that the second catching portion is caught by the lower end of the torsion bar, the first catching portion and the second catching portion being open in different directions.

The first motor link may be assembled in a downward direction from one end to the other end thereof, and the second motor link may be assembled in a downward direction from the other end to one end thereof, whereby the other end of the first motor link and one end of the second motor link may be hinged to each other in the downward direction.

The first motor link may be assembled in an upward direction from one end to the other end thereof, and the second motor link may be assembled in an upward direction from the other end to one end thereof, whereby the other end of the first motor link and one end of the second motor link may be hinged to each other in the upward direction.

BRIEF DESCRIPTION OF THE DRAWINGS

The above and other objects, features and other advantages of embodiments of the present invention will be more clearly understood from the following detailed description taken in conjunction with the accompanying drawings, in which:

FIGS. 8A to 8C are views illustrating a process of opening the hinge arm shown in FIG. 5.

DETAILED DESCRIPTION OF ILLUSTRATIVE EMBODIMENTS

Hereinafter, preferred embodiments of the present invention will be described in detail with reference to the accompanying drawings.

Figure 1:
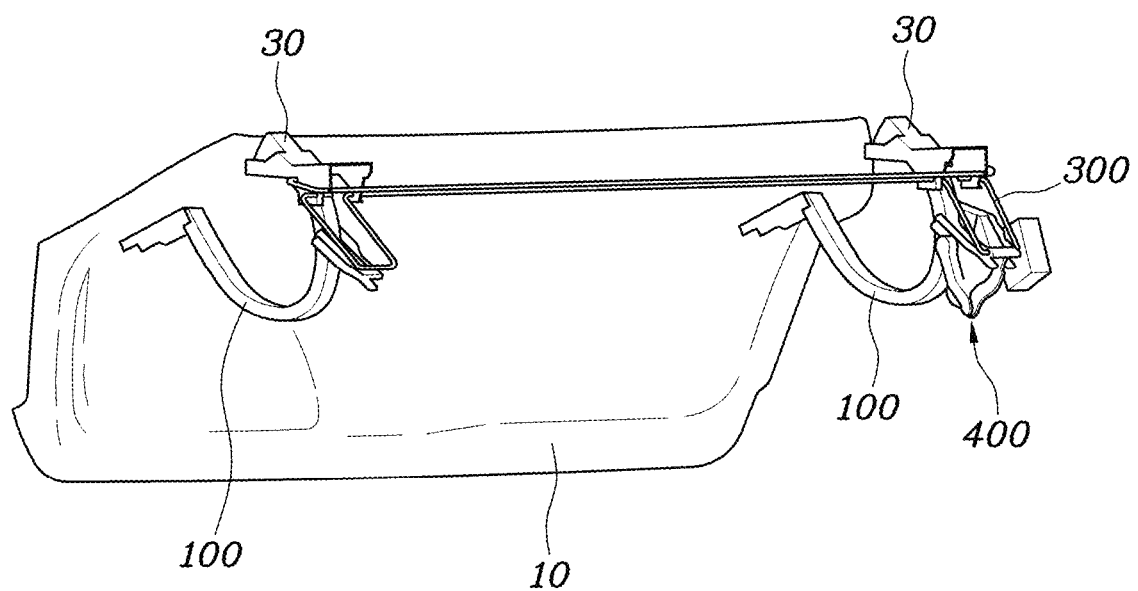
FIG. 1 is a view showing a trunk lid at which a power trunk device according to embodiments of the present invention is installed.

FIG. 1 is a view showing a trunk lid at which a power trunk device according to embodiments of the present invention is installed.

Referring to the figures, the power trunk device according to embodiments of the present invention includes a hinge arm 100 coupled to a trunk lid 10 while being rotatably coupled to a vehicle body panel 20 defining a trunk space, the hinge arm 100 being configured to open and close the trunk lid 10, a torsion bar link 200 rotatably coupled to the middle of the hinge arm 100, a torsion bar 300 connected to the torsion bar link 200 and the vehicle body panel 20 therebetween in front of the hinge arm 100, the torsion bar 300 being configured to provide elastic force in a direction in which the trunk lid 10 is opened, and an electric drive unit (see e.g., FIG. 5 or FIG. 6) connected to the hinge arm 100 and the torsion bar 300 therebetween, the electric drive unit being configured to be moved together with the hinge arm 100 while providing rotational force to the hinge arm 100.

For example, hinge brackets 30 are coupled to opposite sides of a ceiling defining the trunk space in a forward-rearward direction, the upper end of the torsion bar 300, which is formed in a wire shape, is caught by the front end of each hinge bracket 30, and the rear end of the hinge arm 100 is hinged to the rear end of the hinge bracket 30.

In addition, the rear end of the torsion bar link 200 is hinged to the middle of the hinge arm 100, and the lower end of the torsion bar 300 is rotatably caught by the front end of the torsion bar link 200.

When the hinge arm 100 is rotated to open and close the trunk lid 10, therefore, the hinge arm 100, the torsion bar link 200, and the torsion bar 300 are rotated about the hinge bracket 30 like a four-bar link, whereby the hinge arm 100 is rotated.

In particular, the electric drive unit is installed between the hinge arm 100 and the torsion bar 300, and rotational force of a motor 410 constituting the electric drive unit is transmitted to the hinge arm 100 to rotate the hinge arm 100.

In addition, when the hinge arm 100 is rotated in the direction in which the trunk lid 10 is opened, the lower end of the torsion bar 300 pushes the lower end of the torsion bar link 200 by elastic force of the torsion bar 300, whereby assistance to the rotational force of the electric drive unit to rotate the hinge arm 100 is given.

That is, the electric drive unit is installed between the torsion bar 300 and the hinge arm 100 to constitute a power trunk device having an electric opening and closing structure, whereby it is possible to automatically open and close the trunk lid 10.

Furthermore, in embodiments of the present invention, the hinge arm 100 is curved in a "U" shape, the electric drive unit is coupled to the middle of the hinge arm 100, and the middle of the hinge arm 100 is rotated so as to face the front of a vehicle when the trunk lid 10 is closed, whereby the electric drive unit is located in the trunk space in front of the hinge arm 100.

That is, the electric drive unit is located inside the trunk together with the torsion bar 300, whereby the electric drive unit is not exposed outside. Consequently, a luggage trim configured to cover the electric drive unit is minimally applied, whereby it is possible to maximally utilize the trunk space.

Figure 2:
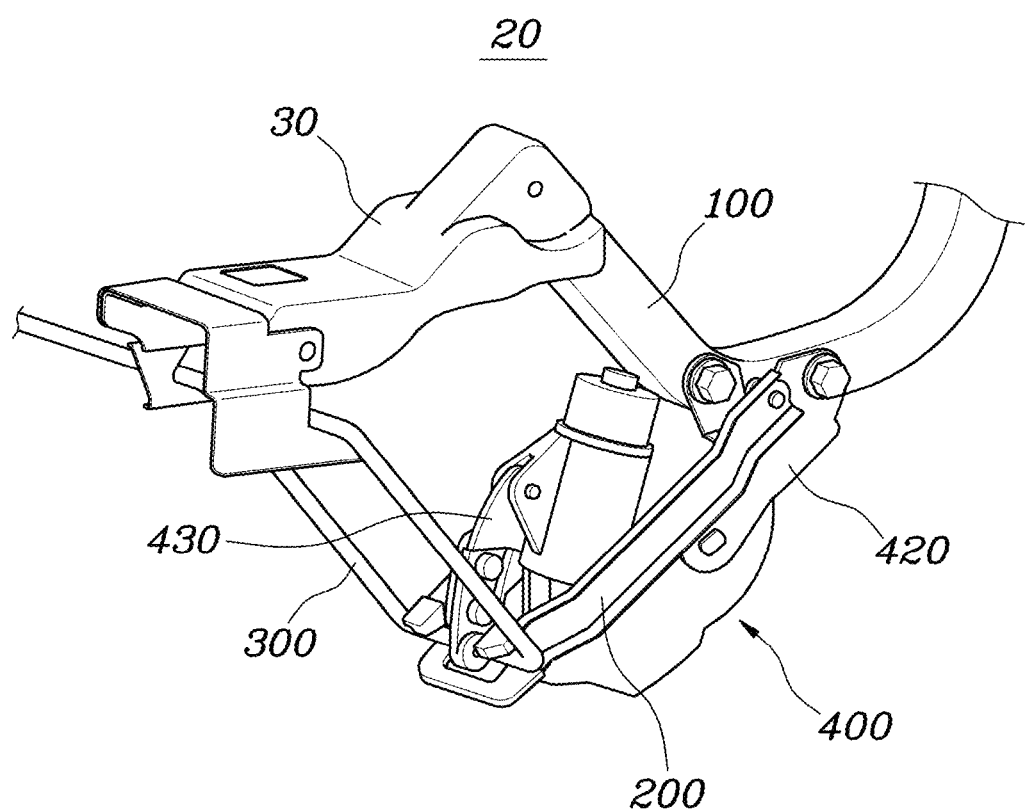
FIG. 2 is a view showing the construction of a first embodiment in which an electric drive unit according to embodiments of the present invention is assembled.
Figure 3:
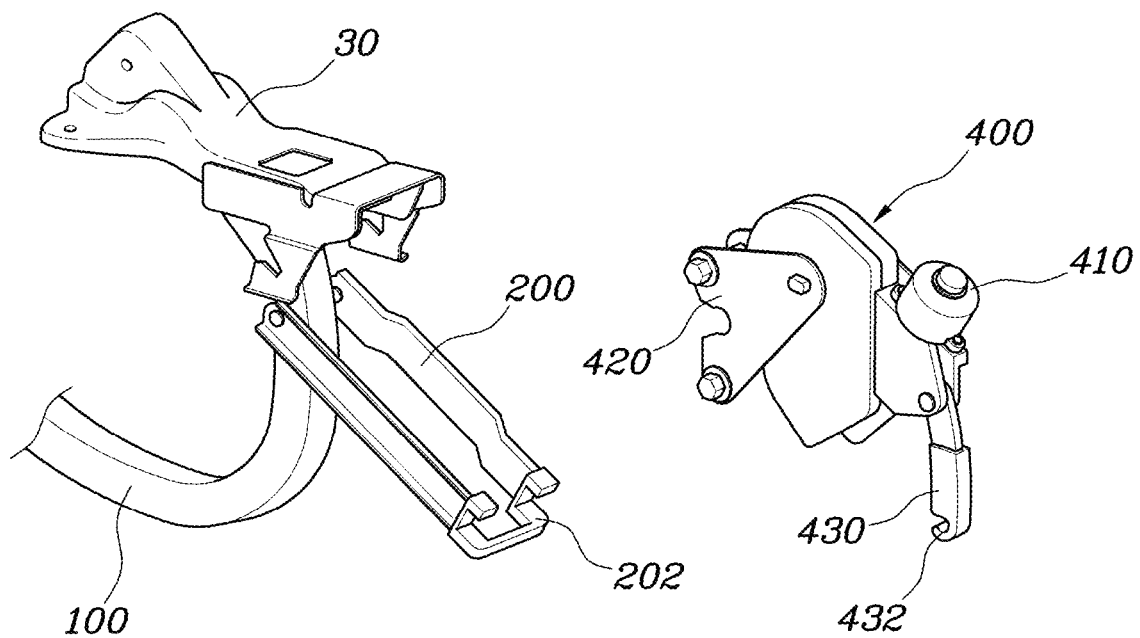
FIG. 3 is a view showing the state in which the electric drive unit shown in FIG. 2 is separated.

FIG. 2 is a view showing the construction of a first embodiment in which an electric drive unit according to embodiments of the present invention is assembled, and FIG. 3 is a view showing the state in which the electric drive unit shown in FIG. 2 is separated.

Referring to the figures, the electric drive unit may be installed so as to be rotatable relative to the hinge arm 100 when the hinge arm 100 is rotated.

Specifically, the electric drive unit may include a motor assembly 400 including a motor 410 configured to provide rotational force to the hinge arm 100 and a rotary shaft 412 provided at one end of a motor housing 400a, the rotary shaft 412 being configured to be rotated in the state of being interlocked with the motor 410, a motor bracket 420 having one end coupled to the middle of the hinge arm 100 and the other end coupled to the rotary shaft 412, and a motor link 430 having one end rotatably coupled to the other end of the motor housing 400a and the other end rotatably caught by the lower end of the torsion bar 300.

For example, the motor 410 may be installed at the rear upper end of the motor housing 400a, and a worm gear may be mounted in the motor housing 400a so as to be rotated by the rotational force of the motor 410.

In addition, an external gear type worm wheel engaged with the worm gear and at least one output gear externally engaged with the worm wheel may be installed in the motor housing 400a. A shaft of the last output gear is exposed outside the motor housing 400a. The shaft of the last output gear constitutes the rotary shaft 412.

The motor bracket 420 is formed in a triangular plate shape. A base plane of the motor bracket 420 is fixedly coupled to the middle of the hinge arm 100 by bolting, and an apex portion of the motor bracket 420 opposite the base plane is fixedly coupled to the rotary shaft 412, whereby the rotational force of the motor 410 is transmitted to the hinge arm 100.

The upper end of the motor link 430 is hinged to the front end of the motor housing 400a, and the lower end of the motor link 430 is caught by the lower end of the torsion bar 300.

That is, when the motor 410 is rotated, the rotary shaft 412 is rotated through a gear engagement structure in the motor housing 400a. Since the rotary shaft 412 is fixed to the motor bracket 420, the motor bracket 420 is rotated in the same direction as the rotary shaft 412, whereby the hinge arm wo coupled to the motor bracket 420 is rotated.

In addition, referring to FIGS. 2 and 3, motor brackets 420 are coupled to opposite sides of the hinge arm 100, the motor assembly 400 is assembled between the motor brackets 420, and one end of each of the torsion bar links 200 is coupled to a corresponding one of the opposite sides of the hinge arm wo such that the torsion bar links 200 cover opposite side surfaces of the motor brackets 420, whereby the electric drive unit is provided between the torsion bar links 200.

For example, the base plane of each of the motor brackets 420 is fixedly coupled to a corresponding one of the opposite sides of the middle of the hinge arm 100, and the apex portions of the motor brackets 420 are fixedly coupled to opposite ends of the rotary shaft 412 at the opposite sides of the motor housing 400a, whereby the motor assembly 400 is assembled between the motor brackets 420.

In addition, the torsion bar links 200 are formed so as to extend in a longitudinal direction and are coupled to the opposite sides of the hinge arm 100. One end of each of the torsion bar links 200 is rotatably coupled to the middle of the hinge arm 100. The middle of the hinge arm wo may be a portion corresponding to the middle of the base plane of each of the motor brackets 420.

A middle portion of each of the torsion bar links 200 extending between one end and the other end thereof is formed so as to protrude outwards in order to secure the distance between the torsion bar links 200. Consequently, the motor assembly 400 may be moved while being rotated in the state of being located between the torsion bar links 200.

In addition, a first catching portion 202 having a shape open at one side thereof is formed in the other end of each of the torsion bar links 200 such that the lower end of the torsion bar 300 is caught by the first catching portion 202, and a second catching portion 432 having a shape open at one side thereof is formed in the other end of the motor link 430 such that the second catching portion 432 is caught by the lower end of the torsion bar 300. The first catching portion 202 and the second catching portion 432 may be open in different directions.

Preferably, the first catching portion 202 and the second catching portion 432 are open in opposite directions.

For example, the other end of one of the torsion bar links 200 and the other end of the other of the torsion bar links 200 are connected to each other, the U-shaped first catching portion 202 is formed in the center of the other end of each of the torsion bar links 200, and the first catching portion 202 is open in a longitudinal direction of each of the torsion bar links 200.

The U-shaped second catching portion 432 is formed in the lower end of the motor link 430, and the second catching portion 432 is open toward the motor assembly 400.

The first catching portion 202 and the second catching portion 432 are caught by the lower end of the torsion bar 300 in different directions, whereby it is possible to prevent the torsion bar 300 from being separated from the first catching portion 202 and the second catching portion 432 during rotation of the hinge arm boo.

In addition, when the hinge arm 100 is rotated, the motor assembly 400 may be rotated in a direction opposite the rotational direction of the hinge arm 100.

Figure 4A:
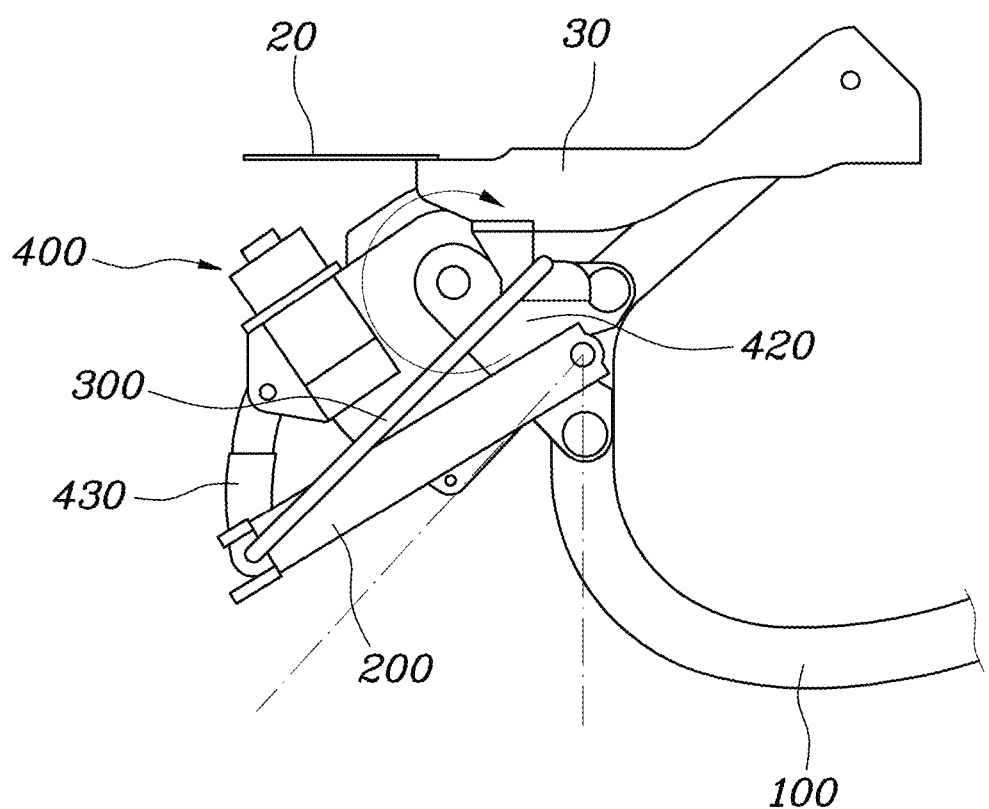
FIGS. 4A to 4C are views illustrating a process of opening a hinge arm shown in FIG. 2.
Figure 4B:
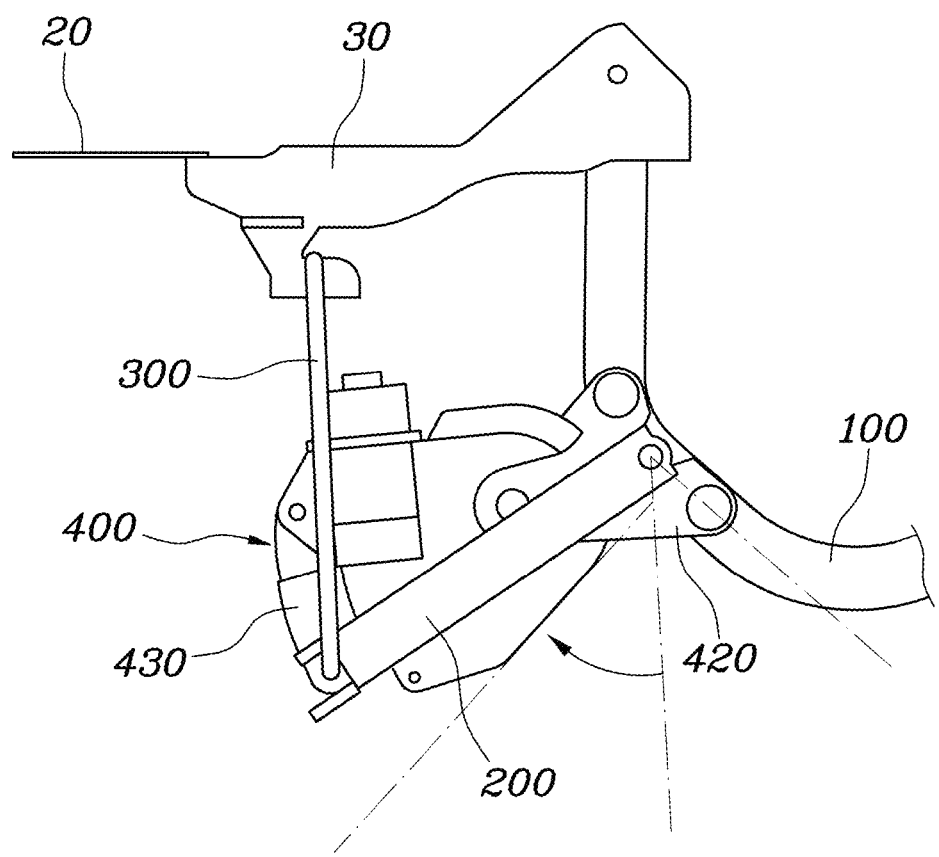
Figure 4C:
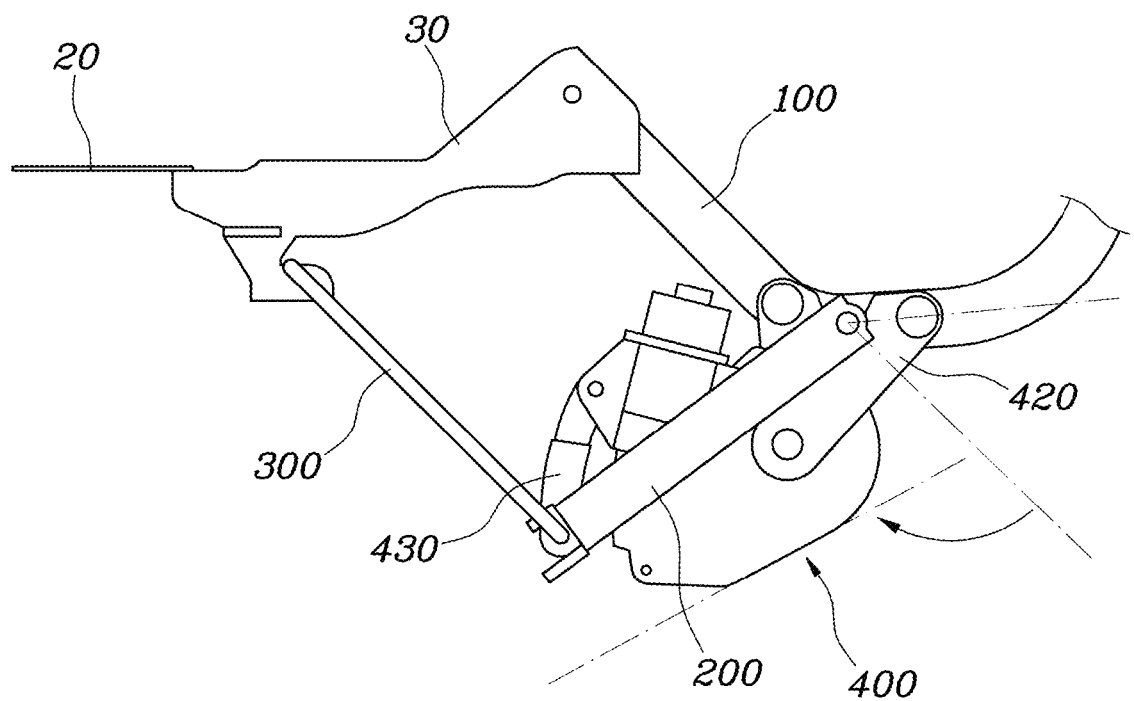

Referring to FIGS. 4A to 4C, when the motor 410 is operated in the direction in which the trunk lid 10 is opened and thus rotational force is applied to the hinge arm 100, the hinge arm 100 is rotated relative to the hinge bracket 30 in a counterclockwise direction, and the motor assembly 400 is rotated together with the hinge arm 100 in a clockwise direction.

On the other hand, when the motor 410 is operated in a direction in which the trunk lid 10 is closed, the hinge arm 100 is rotated relative to the hinge bracket 30 in the clockwise direction, and the motor assembly 400 is rotated together with the hinge arm 100 in the counterclockwise direction.

That is, when the motor 410 is operated in the direction in which the trunk lid 10 is opened, a rotational boundary of the motor assembly 400 is moved downwards so as not to be lower than a rotational boundary of the hinge arm 100, whereby the motor assembly 400 is not exposed outside.

Figure 5:
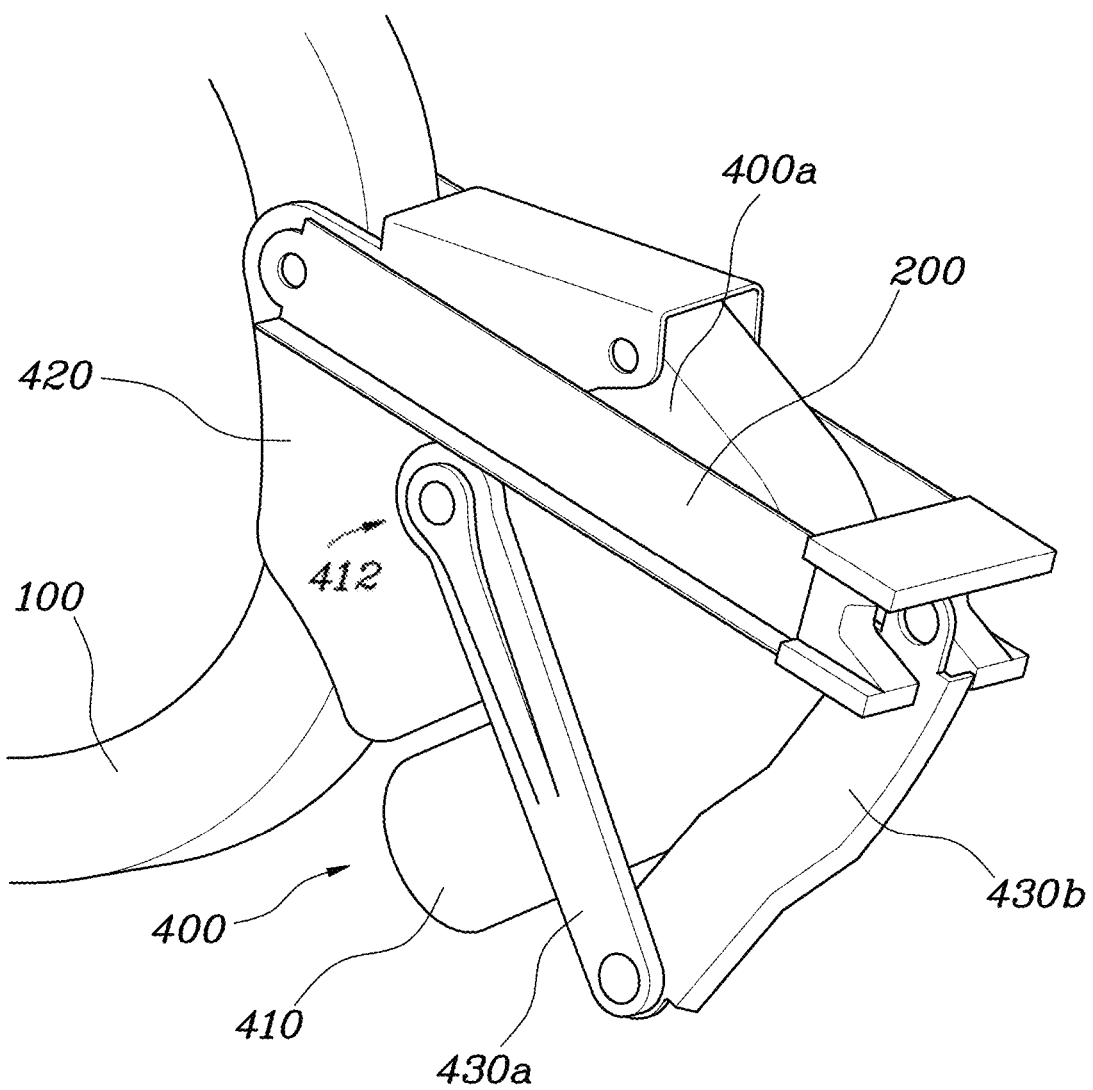
FIG. 5 is a view showing the construction of a second embodiment in which an electric drive unit according to embodiments of the present invention is assembled.
Figure 6:
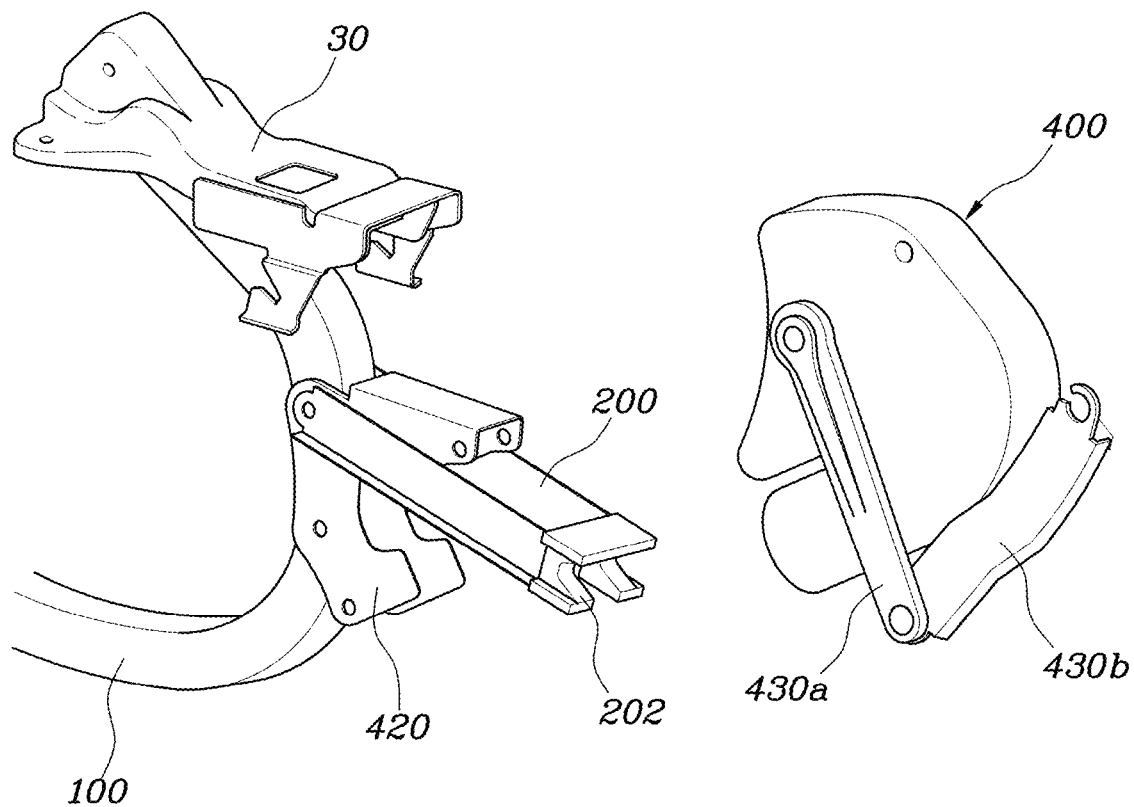
FIG. 6 is a view showing the state in which the electric drive unit shown in FIG. 5 is separated.

Meanwhile, FIG. 5 is a view showing the construction of a second embodiment in which an electric drive unit according to embodiments of the present invention is assembled, and FIG. 6 is a view showing the state in which the electric drive unit shown in FIG. 5 is separated.

Referring to the figures, the electric drive unit may be installed so as to be rotatable in the state of being constrained with respect to the hinge arm wo when the hinge arm wo is rotated.

Specifically, the electric drive unit may include a motor assembly 400 including a motor 410 coupled to the middle of the hinge arm 100, the motor 410 being configured to provide rotational force to the hinge arm 100, and a rotary shaft 412 provided at the middle of a motor housing 400a, the rotary shaft 412 being configured to be rotated in the state of being interlocked with the motor 410, a first motor link 430a having one end coupled to the rotary shaft 412, and a second motor link 430b having one end hinged to the other end of the first motor link 430a and the other end rotatably caught by the lower end of the torsion bar 300.

For example, the motor 410 may be installed at the rear upper end of the motor housing 400a, and a worm gear may be mounted in the motor housing 400a so as to be rotated by the rotational force of the motor 410.

In addition, an external gear type worm wheel engaged with the worm gear and at least one output gear externally engaged with the worm wheel may be installed in the motor housing 400a. A shaft of the last output gear is exposed outside the motor housing 400a. The shaft of the last output gear constitutes the rotary shaft 412.

Each of the first motor link 430a and the second motor link 430b is formed in a bar shape in a longitudinal direction. The first motor link 430a is fixedly coupled to the rotary shaft 412 to transmit the rotational force of the motor to the rotary shaft 412, and the second motor link 430b is caught by the lower end of the torsion bar 300 while being hinged to the first motor link 430a.

That is, when the motor 410 is rotated, the rotary shaft 412 is rotated through a gear engagement structure in the motor housing 400a. Since the rotary shaft 412 is fixed to the first motor link 430a, the motor bracket 420 is rotated in the same direction as the rotary shaft 412. Since the second motor link 430b is connected to the torsion bar 300 in the state of being supported thereby, the hinge arm 100 is rotated together with the motor assembly 400.

In addition, referring to FIGS. 5 and 6, motor brackets 420 are coupled to opposite sides of the hinge arm 100, the motor assembly 400 is assembled between the motor brackets 420, and one end of each of the torsion bar links 200 is coupled to a corresponding one of the opposite sides of the hinge arm 100 such that the torsion bar links 200 cover opposite side surfaces of the motor brackets 420, whereby the electric drive unit is provided between the torsion bar links 200.

For example, one end of each of the motor brackets 420 is fixedly coupled to a corresponding one of the opposite sides of the middle of the hinge arm 100, and the motor assembly 400 is assembled between the other end of one of the motor brackets 420 and the other end of the other of the motor brackets 420.

In addition, the torsion bar links 200 are formed so as to extend in a longitudinal direction and are coupled to the opposite sides of the hinge arm 100. One end of each of the torsion bar links 200 is rotatably coupled to the middle of the hinge arm 100, and the motor assembly 400 may be moved while being rotated in the state of being located between the torsion bar links 200.

A middle portion of each of the torsion bar links 200 extending between one end and the other end thereof is formed so as to protrude outwards, whereby it is possible to secure the distance between the torsion bar links 200.

Figure 7:
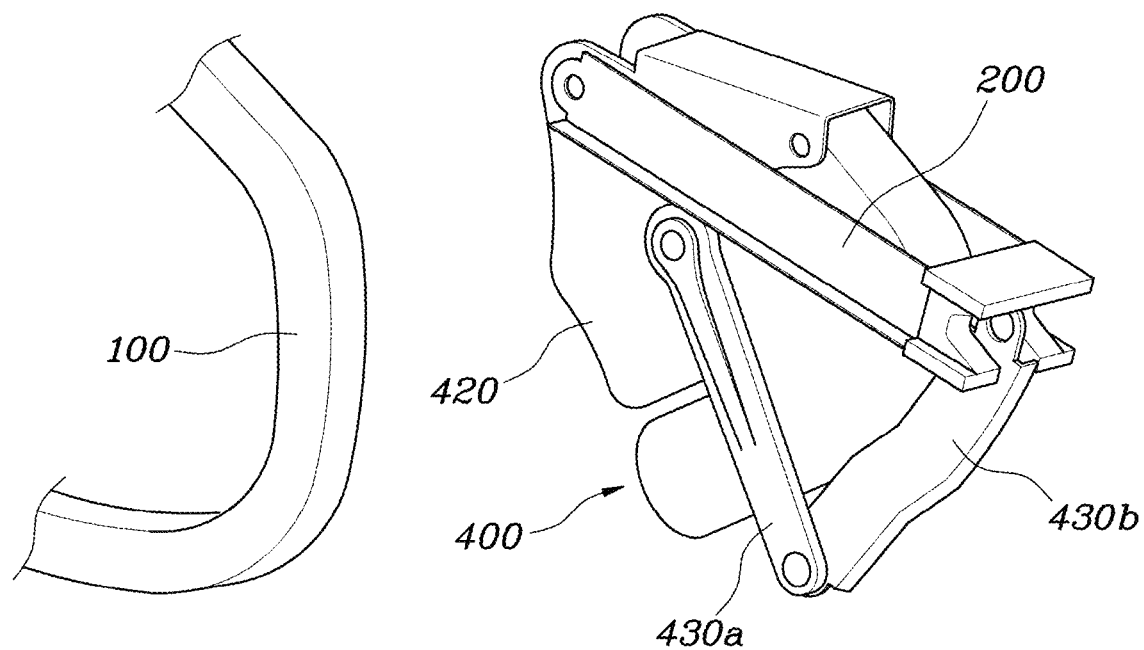
FIG. 7 is a view showing the state in which the electric drive unit and a torsion bar link shown in FIG. 5 are separated from a hinge arm.

For reference, FIG. 7 is a view showing the state in which the electric drive unit and the torsion bar links 200 shown in FIG. 5 are separated from the hinge arm 100. The torsion bar links 200 may be coupled to the hinge arm 100 in the state of being coupled to the electric drive unit. Alternatively, as shown in FIG. 6, the electric drive unit may be coupled to the torsion bar links 200 in the state in which the torsion bar links 200 are coupled to the hinge arm 100.

In addition, a first catching portion 202 having a shape open at one side thereof is formed in the other end of each of the torsion bar links 200 such that the lower end of the torsion bar 300 is caught by the first catching portion 202, and a second catching portion 432 having a shape open at one side thereof is formed in the other end of the second motor link 430b such that the second catching portion 432 is caught by the lower end of the torsion bar 300. The first catching portion 202 and the second catching portion 432 may be open in different directions.

Preferably, the first catching portion 202 and the second catching portion 432 are open in opposite directions.

For example, the other end of one of the torsion bar links 200 and the other end of the other of the torsion bar links 200 are connected to each other, the U-shaped first catching portion 202 is formed in the center of the other end of each of the torsion bar links 200, and the first catching portion 202 is open in a longitudinal direction of each of the torsion bar links 200.

The U-shaped second catching portion 432 is formed in the lower end of the second motor link 430b, and the second catching portion 432 is open toward the motor assembly 400.

The first catching portion 202 and the second catching portion 432 are caught by the lower end of the torsion bar 300 in different directions, whereby it is possible to prevent the torsion bar 300 from being separated from the first catching portions 202 and the second catching portion 432 during rotation of the hinge arm 100.

In addition, the first motor link 430a and the second motor link 430b may be assembled in an upward direction or in a downward direction.

As an example, as shown in FIG. 5, the first motor link 430a may be assembled in a downward direction from one end to the other end thereof, and the second motor link 430b may be assembled in a downward direction from the other end to one end thereof, whereby hinge coupling portions of the other end of the first motor link 430a and one end of the second motor link 430b may be assembled in the downward direction.

As another example, although not shown, the first motor link 430a may be assembled in an upward direction from one end to the other end thereof, and the second motor link 430b may be assembled in an upward direction from the other end to one end thereof, whereby hinge coupling portions of the other end of the first motor link 430a and one end of the second motor link 430b may be assembled in the upward direction.

Hereinafter, the operation of the power trunk device according to the first embodiment of the present invention will be described with reference to FIGS. 4A to 4C. When the motor 410 is operated in the direction in which the trunk lid 10 is opened, the rotary shaft 412 is rotated by the rotational force of the motor 410 in the clockwise direction.

The motor bracket 420 is rotated together with the rotary shaft 412 in the clockwise direction. As a result, as shown in FIG. 4B, the hinge arm 100 coupled to the motor bracket 420 is rotated about the hinge bracket 30 in the counterclockwise direction.

As the rotational force of the motor 410 is continuously applied, the rotational angle of the hinge arm 100 in the counterclockwise direction is increased, as shown in FIG. 4C, whereby the trunk lid 10 coupled to the hinge arm wo is completely opened.

While the hinge arm wo is rotated relative to the hinge bracket 30 in the counterclockwise direction, however, the motor assembly 400 is rotated together with the hinge arm 100 in the clockwise direction. Consequently, the rotational boundary of the motor assembly 400 is moved downwards so as not to be lower than the rotational boundary of the hinge arm 100, whereby the motor assembly 400 is not exposed outside.

Figure 8A:
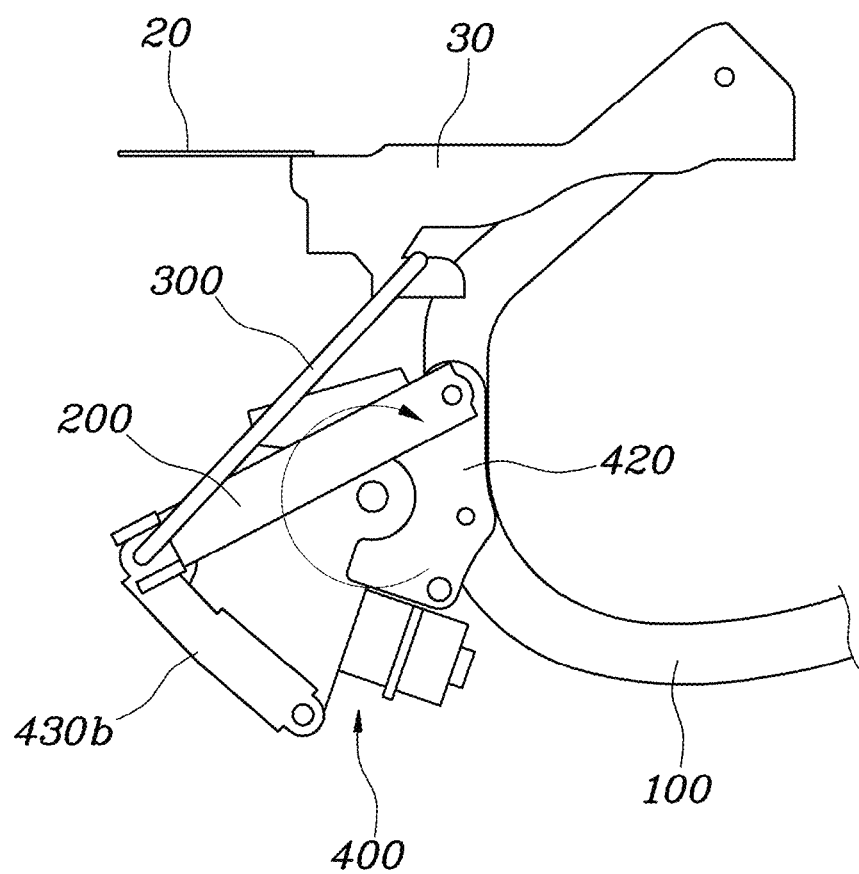

The operation of the power trunk device according to the second embodiment of the present invention will be described with reference to FIGS. 8A to 8C. When the motor 410 is operated in the direction in which the trunk lid 10 is opened, the rotary shaft 412 is rotated by the rotational force of the motor 410 in the clockwise direction.

The first motor link 430a is rotated together with the rotary shaft 412 in the clockwise direction in the state in which the second motor link 43ob is supported by the lower ends of the torsion bar links 200. As a result, as shown in FIG. 8B, the hinge arm 100 coupled to the motor bracket 420 is rotated about the hinge bracket 30 in the counterclockwise direction.

Figure 8C:
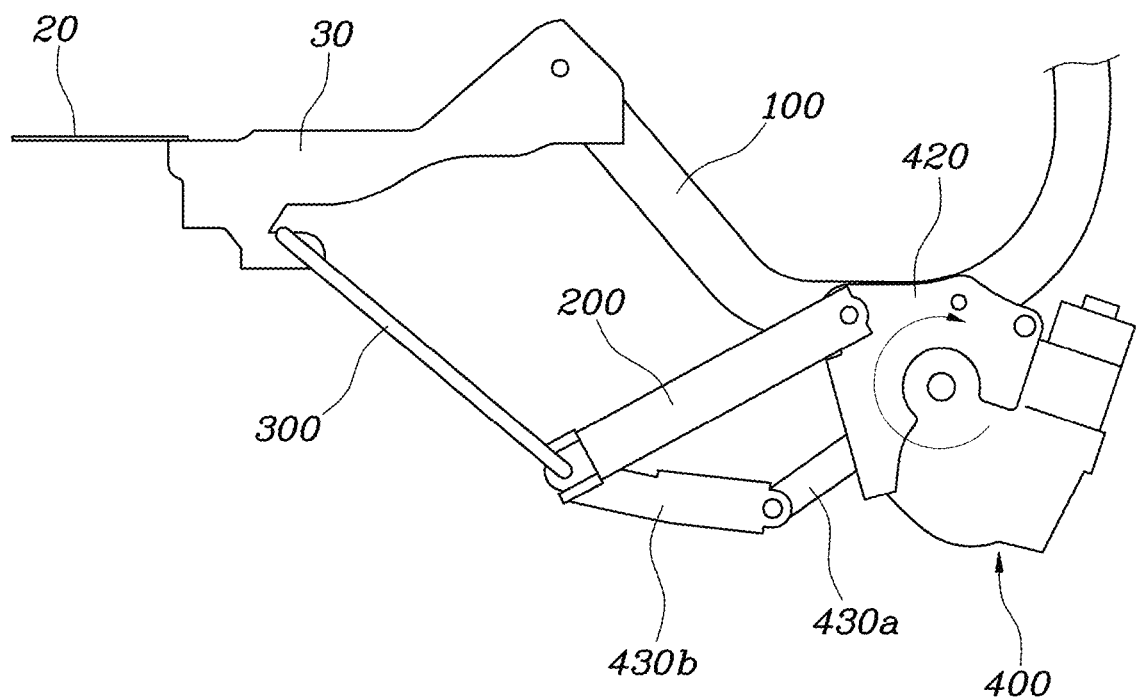

As the rotational force of the motor 410 is continuously applied, the rotational angle of the hinge arm 100 in the counterclockwise direction is increased, as shown in FIG. 8C, whereby the trunk lid 10 coupled to the hinge arm 100 is completely opened.

In embodiments of the present invention, as described above, the electric drive unit is installed between the torsion bar and the hinge arm 100 to constitute a power trunk device having an electric opening and closing structure, whereby it is possible to automatically open and close the trunk lid 10. In particular, the electric drive unit is located inside the trunk together with the torsion bar 300, whereby the electric drive unit is not exposed outside. Consequently, a luggage trim configured to cover the electric drive unit is minimally applied, whereby it is possible to maximally utilize the trunk space.

As is apparent from the above description, embodiments of the present invention have effects in that the electric drive unit is installed between the torsion bar and the hinge arm to constitute a power trunk device having an electric opening and closing structure, whereby it is possible to automatically open and close the trunk lid, and in that the electric drive unit is located inside the trunk together with the torsion bar such that the electric drive unit is not exposed outside, and therefore a luggage trim configured to cover the electric drive unit is minimally applied, whereby it is possible to maximally utilize the trunk space.

Although the preferred embodiments of the present invention have been described above with reference to the accompanying drawings, those skilled in the art will appreciate that the present invention can be implemented in various other embodiments without changing the technical ideas or features thereof.

What is claimed is:

1. Power trunk device comprising:
a hinge arm coupled to a trunk lid and configured to be rotatably coupled to a vehicle body panel to define a trunk space, the hinge arm being configured to open and close the trunk lid;
a torsion bar link rotatably coupled to a middle of the hinge arm;
a torsion bar connected between the torsion bar link and the vehicle body panel in front of the hinge arm, the torsion bar being configured to provide elastic force in a direction in which the trunk lid is opened; and
an electric drive unit connected between the hinge arm and the torsion bar, the electric drive unit being configured to be moved together with the hinge arm while providing rotational force to the hinge arm, wherein the electric drive unit is configured to be rotatable relative to the hinge arm when the hinge arm is rotated and wherein the electric drive unit comprises:
a motor assembly comprising a motor configured to provide rotational force to the hinge arm and a rotary shaft provided at a first end of a motor housing, the rotary shaft being configured to be rotated in a state of being interlocked with the motor;
a first motor bracket having a first end coupled to the middle of the hinge arm and a second end coupled to the rotary shaft; and
a motor link having a first end rotatably coupled to a second end of the motor housing and a second end configured to be rotatably caught by a lower end of the torsion bar.

2. The power trunk device according to claim 1, wherein:
the hinge arm is curved in a "U" shape such that the electric drive unit is coupled to the middle of the hinge arm; and
the middle of the hinge arm is configured to be rotated to face a front of a vehicle when the trunk lid is closed, and the electric drive unit is located in the trunk space in front of the hinge arm.

3. The power trunk device according to claim 2, wherein:
the torsion bar link is one of a plurality of torsion bar links;
the first motor bracket and a second motor bracket are coupled to opposite sides of the hinge arm;
the motor assembly is assembled between the first and the second motor brackets; and
a first end of each of the torsion bar links is coupled to a corresponding one of the opposite sides of the hinge arm such that the torsion bar links cover opposite side surfaces of the motor brackets, wherein the electric drive unit is provided between the torsion bar links.

4. The power trunk device according to claim 2, wherein:
a first catching portion having a shape open at one side thereof is formed in a second end of the torsion bar link such that the lower end of the torsion bar is configured to be caught by the first catching portion;
a second catching portion having a shape open at one side thereof is formed in the second end of the motor link such that the second catching portion is configured to be caught by the lower end of the torsion bar; and
the first catching portion and the second catching portion are open in different directions.

5. The power trunk device according to claim 2, wherein, when the hinge arm is rotated, the motor assembly is configured to be rotated in a direction opposite a rotational direction of the hinge arm.

6. The power trunk device according to claim 1, wherein:
the torsion bar link is one of a plurality of torsion bar links;
the first motor bracket and a second motor bracket are coupled to opposite sides of the hinge arm;
the motor assembly is assembled between the first and the second motor brackets; and
a first end of each of the torsion bar links is coupled to a corresponding one of the opposite sides of the hinge arm such that the torsion bar links cover opposite side surfaces of motor brackets, wherein the electric drive unit is provided between the torsion bar links.

7. The power trunk device according to claim 1, wherein:
a first catching portion having a shape open at one side thereof is formed in a second end of the torsion bar link such that the lower end of the torsion bar is configured to be caught by the first catching portion;
a second catching portion having a shape open at one side thereof is formed in the second end of the motor link such that the second catching portion is configured to be caught by the lower end of the torsion bar; and
the first catching portion and the second catching portion are open in different directions.

8. The power trunk device according to claim 1, wherein, when the hinge arm is rotated, the motor assembly is configured to be rotated in a direction opposite a rotational direction of the hinge arm.

9. A power trunk device comprising:
a hinge arm coupled to a trunk lid and configured to be rotatably coupled to a vehicle body panel to define a trunk space, the hinge arm being configured to open and close the trunk lid;

a torsion bar link rotatably coupled to a middle of the hinge arm;
a torsion bar connected to the torsion bar link and the vehicle body panel in front of the hinge arm, the torsion bar being configured to provide elastic force in a direction in which the trunk lid is opened; and
an electric drive unit connected to the hinge arm and the torsion bar, the electric drive unit being configured to be moved together with the hinge arm while providing rotational force to the hinge arm, and the electric drive unit being configured to be rotatable in a state of being constrained with respect to the hinge arm when the hinge arm is rotated, wherein the electric drive unit comprises:
a motor assembly comprising a motor coupled to the middle of the hinge arm, the motor being configured to provide rotational force to the hinge arm, and a rotary shaft provided at a middle of a motor housing, the rotary shaft being configured to be rotated in a state of being interlocked with the motor;
a first motor link having a first end coupled to the rotary shaft; and
a second motor link having a first end hinged to a second end of the first motor link and a second end rotatably caught by a lower end of the torsion bar.

10. The power trunk device according to claim 9, further comprising motor brackets coupled to opposite sides of the hinge arm, wherein:
the torsion bar link is one of a plurality of torsion bar links;
the motor assembly is assembled between the motor brackets; and
a first end of each of the torsion bar links is coupled to a corresponding one of the opposite sides of the hinge arm such that the torsion bar links cover opposite side surfaces of the motor brackets, wherein the electric drive unit is provided between the torsion bar links.

11. The power trunk device according to claim 9, wherein:
a first catching portion having a shape open at one side thereof is formed in a second end of the torsion bar link such that the lower end of the torsion bar is configured to be caught by the first catching portion;
a second catching portion having a shape open at one side thereof is formed in a second end of the second motor link such that the second catching portion is configured to be caught by the lower end of the torsion bar; and
the first catching portion and the second catching portion are open in different directions.

12. The power trunk device according to claim 9, wherein:
the first motor link is assembled in a downward direction from the first end to the second end thereof; and
the second motor link is assembled in a downward direction from the second end to the first end thereof, wherein the second end of the first motor link and the first end of the second motor link are hinged to each other in the downward direction.

13. The power trunk device according to claim 9, wherein:
the first motor link is assembled in an upward direction from the first end to the second end thereof; and
the second motor link is assembled in an upward direction from the second end to the first end thereof, wherein the second end of the first motor link and the first end of the second motor link are hinged to each other in the upward direction.

14. A vehicle comprising:
a vehicle body comprising at least one vehicle body panel;
a trunk lid coupled to the at least one vehicle body panel;
a hinge arm coupled to the trunk lid and rotatably coupled to the at least one vehicle body panel to define a trunk space, the hinge arm being configured to open and close the trunk lid;
a torsion bar link rotatably coupled to a middle of the hinge arm;
a torsion bar connected to the torsion bar link and the vehicle body panel in front of the hinge arm, the torsion bar being configured to provide elastic force in a direction in which the trunk lid is opened; and
an electric drive unit connected to the hinge arm and the torsion bar, the electric drive unit being configured to be moved together with the hinge arm while providing rotational force to the hinge arm, wherein the electric drive unit is configured to be rotatable relative to the hinge arm when the hinge arm is rotated and wherein the electric drive unit comprises:
a motor assembly comprising a motor configured to provide rotational force to the hinge arm and a rotary shaft provided at a first end of a motor housing, the rotary shaft being configured to be rotated in a state of being interlocked with the motor;
a first motor bracket having a first end coupled to the middle of the hinge arm and a second end coupled to the rotary shaft; and
a motor link having a first end rotatably coupled to a second end of the motor housing and a second end configured to be rotatably caught by a lower end of the torsion bar.

15. The vehicle according to claim 14, wherein:
the hinge arm is curved in a "U" shape such that the electric drive unit is coupled to the middle of the hinge arm; and
the middle of the hinge arm is configured to be rotated to face a front of the vehicle when the trunk lid is closed, and the electric drive unit is located in the trunk space in front of the hinge arm.

16. The vehicle according to claim 15, wherein:
the torsion bar link is one of a plurality of torsion bar links;
the first motor bracket and a second motor bracket are coupled to opposite sides of the hinge arm;
the motor assembly is assembled between the first and the second motor brackets; and
a first end of each of the torsion bar links is coupled to a corresponding one of the opposite sides of the hinge arm such that the torsion bar links cover opposite side surfaces of the motor brackets, wherein the electric drive unit is provided between the torsion bar links.

17. The vehicle according to claim 15, wherein:
a first catching portion having a shape open at one side thereof is formed in a second end of the torsion bar link such that the lower end of the torsion bar is configured to be caught by the first catching portion;
a second catching portion having a shape open at one side thereof is formed in the second end of the motor link such that the second catching portion is configured to be caught by the lower end of the torsion bar; and
the first catching portion and the second catching portion are open in different directions.

18. The vehicle according to claim 14, wherein:
the torsion bar link is one of a plurality of a torsion bar links;
the first motor bracket and a second motor bracket are coupled to opposite sides of the hinge arm;
the motor assembly is assembled between the first and the second motor brackets; and a first end of each of the torsion bar links is coupled to a corresponding one of the opposite sides of the hinge arm such that the torsion bar links cover opposite side surfaces of the motor brackets, wherein the electric drive unit is provided between the torsion bar links.

19. The vehicle according to claim 14, wherein:

a first catching portion having a shape open at one side thereof is formed in a second end of the torsion bar link such that the lower end of the torsion bar is configured to be caught by the first catching portion;

a second catching portion having a shape open at one side thereof is formed in the second end of the motor link such that the second catching portion is configured to be caught by the lower end of the torsion bar; and the first catching portion and the second catching portion are open in different directions.

20. The vehicle according to claim 14, wherein, when the hinge arm is rotated, the motor assembly is configured to be rotated in a direction opposite a rotational direction of the hinge arm.

* * * * *

UNITED STATES PATENT AND TRADEMARK OFFICE
CERTIFICATE OF CORRECTION

PATENT NO. : 12,116,822 B2
APPLICATION NO. : 17/375224
DATED : October 15, 2024
INVENTOR(S) : Im et al.

Page 1 of 1

It is certified that error appears in the above-identified patent and that said Letters Patent is hereby corrected as shown below:

In the Claims

In Column 12, in Claim 18, Line 62, after "plurality" delete "of a" and insert -- of --.

Signed and Sealed this
Seventeenth Day of December, 2024

Derrick Brent
*Acting Director of the United States Patent and Trademark Office*